United States Patent [19]
Firth

[11] 3,765,259
[45] Oct. 16, 1973

[54] FORWARD AND REVERSE DRIVE MECHANISM FOR A MACHINE TOOL

[75] Inventor: Arthur Jose Firth, Colchester, England

[73] Assignee: 600 Machine Tools Limited, London, England

[22] Filed: Feb. 22, 1972

[21] Appl. No.: 227,865

[30]    Foreign Application Priority Data
   Feb. 25, 1971   Great Britain..................... 5,430/71

[52] U.S. Cl....................... 74/354, 74/355, 408/133
[51] Int. Cl.......................... F16h 3/34, B23b 47/14
[58] Field of Search.............................. 74/354, 355

[56]          References Cited
         UNITED STATES PATENTS
1,834,716   12/1931   Kis........................................ 74/354
2,340,679   2/1944   Moore................................. 74/354
2,426,299   8/1947   Dyer................................. 74/254 X
3,621,730   11/1971   Jennings............................... 74/354

FOREIGN PATENTS OR APPLICATIONS
  474,535   6/1951   Canada................................. 74/355
1,041,190   9/1966   Great Britain........................ 74/354

Primary Examiner—Manuel A. Antonakas
Assistant Examiner—Thomas C. Perry
Attorney—Bacon et al.

[57]          ABSTRACT

Particularly for feeding the quill of a milling machine, a forward and reverse drive mechanism having a neutral (non-drive) position, including a gear on the drive shaft selectively engageable by one of two other gears disposed one on each side of the drive shaft gear, each other gear being carried by a lay shaft one or both of which drives a driven shaft and if only one lay shaft drives the driven shaft, that lay shaft is driven by the other lay shaft through an idler gear.

11 Claims, 4 Drawing Figures

FORWARD AND REVERSE DRIVE MECHANISM FOR A MACHINE TOOL

This invention relates to a forward and reverse drive mechanism for a machine tool and particularly to such a mechanism for driving the quill feed in a milling machine.

In many machine tools, it is necessary to provide a mechanism which will feed the tool in a forward, or work engaging direction and also in a reverse, or working disengaging direction. A separate mechanism, with its own prime mover, may be provided for rotating the tool to perform its cutting or other operation on the work. The feed mechanism for the quill of a milling machine to which this invention is particularly, though not exclusively applicable, has to be selectively engageable by the operator of the machine to feed the quill downwardly towards the work or upwardly away from the work with the facility of a neutral position in which neither feed is engaged.

It is the main object of this invention to provide a forward and reverse drive mechanism for the quill feed in a milling machine which is simple in construction and operation.

According to the present invention there is provided a forward and reverse drive mechanism for a machine tool, including a drive shaft, a worm on the drive shaft, a forward drive lay shaft and a reverse drive lay shaft, a pivoted housing carrying both of said lay shafts one on each side of the worm, each said lay shaft carrying a worm wheel for selective engagement with the worm on pivotal movement of the housing, both of said lay shafts driving a common driven shaft.

The invention also includes a drive mechanism as aforesaid, in which the forward drive lay shaft and the reverse drive lay shaft are disposed parallel to each other, one said lay shaft carrying a spiral pinion in engagement with a spiral gear on the driven shaft and the other said lay shaft driving the one said lay shaft through an idler gear. Preferably, the said idler gear is a spur gear in engagement with two other spur gears, one on each said lay shaft.

The invention also includes a drive mechanism as aforesaid, in which the said driven shaft carries a bevel gear wheel, both of said lay shafts being disposed radially to said bevel gear wheel and carrying bevel gears in engagement therewith.

The invention further includes the said housing being pivotally mounted for movement about the axis of the said driven shaft, manually operable means being provided for movement of the housing to effect forward or reverse drive or disengagement of the drive. Detent means may be provided for temporarily retaining the manually operable means in each one of the selected positions.

In order more particularly to describe the invention, two embodiments thereof will now be described, by way of example only, and with reference to the accompanying drawings, in which.

Figure 1:
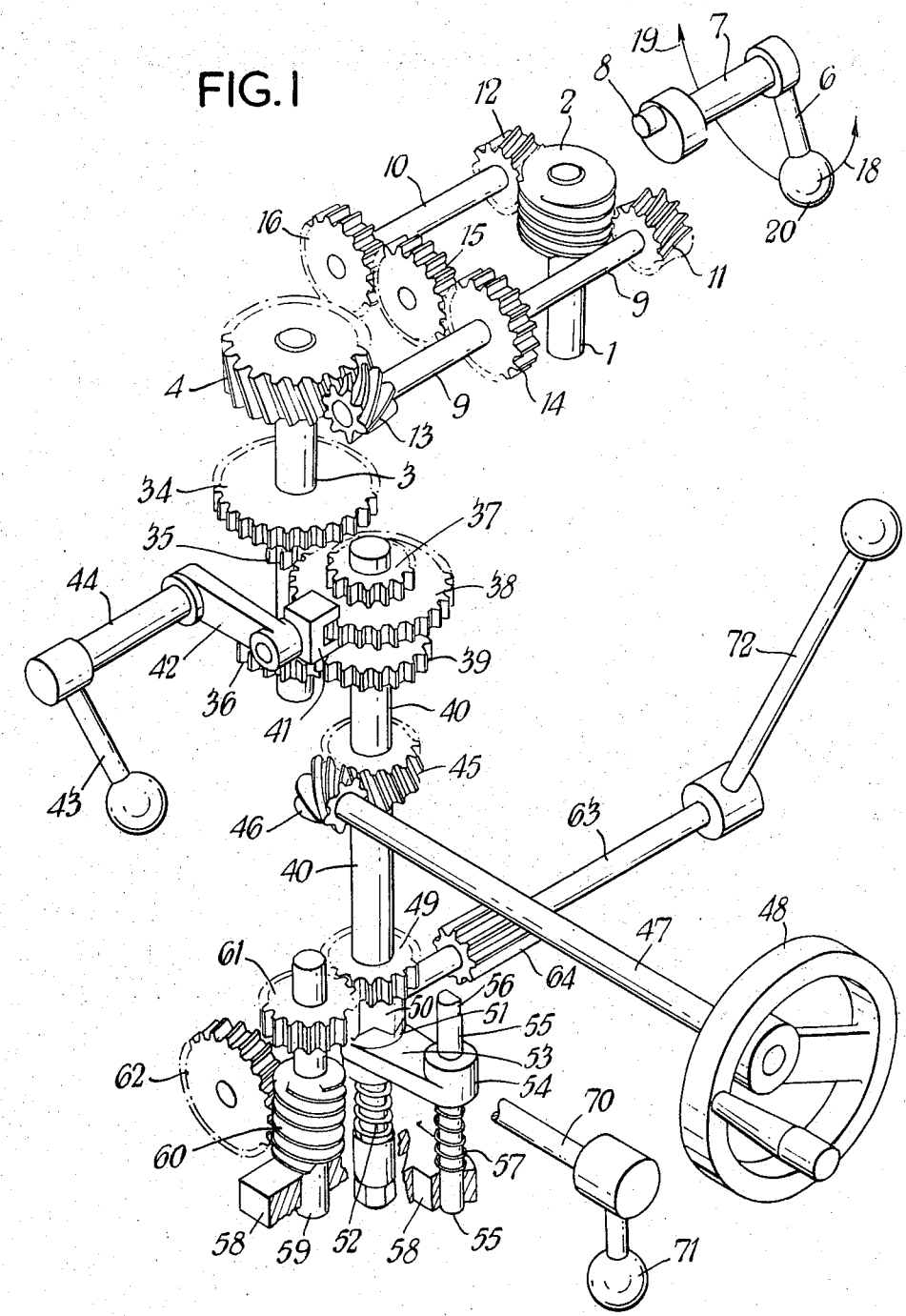
FIG. 1 is a diagrammatic perspective view of a quill feed drive mechanism for a milling machine incorporating a forward and reverse drive mechanism according to the invention.
Figure 2:
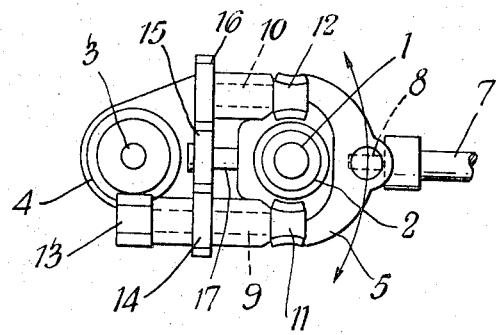
FIG. 2 is a diagrammatic plan view of the forward and reverse drive mechanism of FIG. 1.

In the drawing, there is shown a drive shaft 1 carrying a worm 2. The drive shaft 1 and worm 2 are driven from a prime mover in known manner. A driven shaft 3 carries a spiral gear 4 and this driven shaft 3 drives further mechanism for feeding the quill which forms no part of the present invention. A housing 5, see FIG. 2, is pivotally mounted for rotation about the driven shaft 3 and the housing 5 is manually movable by a lever 6 attached to a shaft 7 having a pin 8 which engages the housing 5. The lever 6 may be replaced by a hand wheel. The housing 5 carries a forward feed lay shaft 9 and a reverse feed lay shaft 10 lying one on each side of the worm 2. The lay shafts 9 and 10 are disposed parallel to each other and carry worm wheels 11 and 12 respectively for selective engagement with worm 2 on operation of lever 6. Lay shaft 9 carries a spiral pinion 13 in engagement with spiral gear 4 and also a spur gear 14 meshing with idler spur gear 15 which, in turn, meshes with spur gear 16 on lay shaft 10. Idler spur gear 15 is carried by shaft 17 in the housing 5. The lever 6 is manually operable to move the housing 5 to one of three selectable positions. Each such position may be temporarily retained by a detent mechanism (not shown) and the position of the lever 6 will indicate to the operator of the machine in which position the feed mechanism is presently situated. If a hand wheel replaces the lever 6, the hand wheel will be provided with a suitable indicating means to show the state of the mechanism.

In use, if the lever 6 is moved to the position 18, the housing 5 will be pivoted about driven shaft 3 so that worm wheel 11 engages worm 2 and the driven shaft 3 will be rotated in a sense for the forward feed of the quill. If the lever 6 is moved to the position 19, worm wheel 12 engages worm 2 and driven shaft 3 will be rotated in the reverse sense for reverse feed of the quill. If, however, lever 6 is moved to the position 20 as indicated in the drawing, neither of worm wheels 11 or 12 will be engaged with worm 2 and the feed drive will be disconnected.

Figure 3:
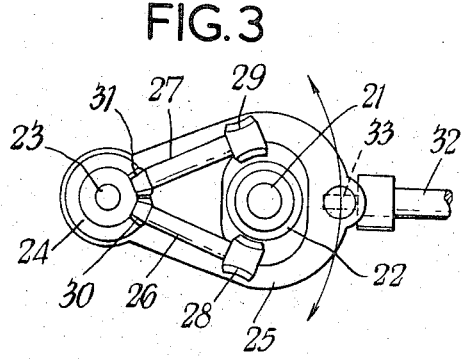
FIG. 3 is a diagrammatic plan view of an alternative forward and reverse drive mechanism according to the invention.

An alternative embodiment of forward and reverse drive mechanism in accordance with the invention is shown in FIG. 3. In this embodiment, a drive shaft 21 carries a worm 22, driven, as in the previous embodiment, by a prime mover (not shown). A driven shaft 23 carries a bevel gear wheel 24 and a housing 25 is pivotally mounted for movement about shaft 23. The housing 25 carries a forward drive lay shaft 26 and a reverse drive lay shaft 27 both disposed radially with respect to the bevel gear wheel 24 and lying one on each side of the worm 22. The lay shafts 26 and 27 carry worm wheels 28 and 29 respectively for selective engagement with worm 22 and also carry bevel gears 30 and 31 respectively meshing with bevel gear wheel 24.

The housing 25 is manually movable by a lever or hand wheel (not shown) mounted on shaft 32 having a pin 33 which engages the housing 25. In this embodiment also, detent means may be provided for temporarily retaining the lever or hand wheel in one of three selectable positions, namely, for forward feed with the worm wheel 28 meshing with worm 22; for reverse feed with the worm wheel 29 meshing with worm 22; or for disengagement of the feed with neither of the worm wheels 28 or 29 meshing with worm 22.

Driven shaft 3 carries three spur gears 34, 35 and 36 of a speed change gear assembly and these three gears selectively engage spur gears 37, 38 and 39 respectively carried by intermediate shaft 40. The three gears 37, 38 and 39 are manually movable by fork 41 pivotally mounted on crank 42 and operable by lever 43 turning shaft 44. Lever 43 may be replaced by a hand wheel. Lever 43 has three positions for engagement of the gear pairs and also two further positions which may lie between the three gear engagement positions. These two further positions are neutral positions, indicating that all the gears are disengaged.

Intermediate shaft 40 carries a helical or spiral gear 45 which meshes with a similar gear 46 on shaft 47 turned by hand wheel 48 for effecting fine feed, either forward or reverse, of the quill. This hand wheel 48 may be provided with a disengagement means (not shown) which would only be engaged when fine hand feed of the quill is to be effected.

Figure 4:
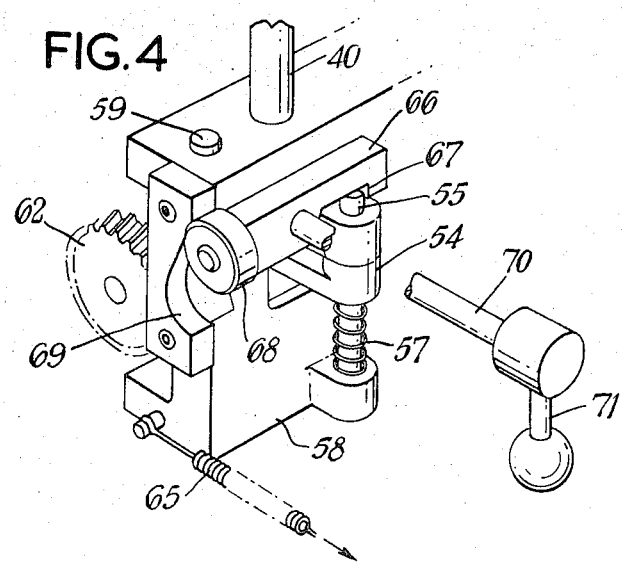
FIG. 4 is a diagrammatic perspective view of a further part of the mechanism of FIG. 1.

The intermediate shaft 40 has, freely rotatable thereon, a spur gear 49. This gear 49, however, is prevented from movement axially of the intermediate shaft 40. Forming part of gear 49 is a first angled face clutch part 50 co-operating with a second angled face clutch part 51 loaded by spring 52 to the engaged position. Clutch part 51 has below it flange 53 integral with boss 54 which carries pin 55 having a flat 56, the boss 54 being loaded by spring 57. The lower end of pin 55 enters a further housing 58 more particularly shown in FIG. 4 and this further housing 58 carries a shaft 59 on which is mounted a worm 60 and a spur gear 61, the latter meshing with spur gear 49.

The further housing 58 is pivotally mounted about intermediate shaft 40 and, in the position of further housing 58 shown in the drawing, worm 60 is in engagement with a worm wheel 62 carried by an output shaft 63 having a pinion 64 for engagement with a rack (not shown) attached to the quill.

The further housing 58 is loaded by spring 65 tending to pivot further housing 58 about intermediate shaft 40 and disengage worm 60 from worm wheel 62 but, under normal quill feed conditions, this is prevented by an arm 66 having a part 67 thereof being engaged by the pin 55. This arm 66 is pivotally mounted on a fixed part of the machine and has a wheel 68 engaging a cam track 69 forming part of the further housing 58. A shaft 70 connects a lever or hand wheel 71 to the arm 66 for manual engagement and disengagement of worm 60 and worm wheel 62.

In operation and during normal forward or reverse feed of the quill, intermediate shaft 40 will turn clutch part 51 which is splined to it and through the angled faces of the clutch will drive gear 49, gear 61 and shaft 59. This will drive worm 60, worm wheel 62, shaft 63 and pinion 64 to feed the quill. If, however, any abnormal torque is imposed on worm 60 due to the quill or tool meeting an unyielding obstruction, rotation of spur gear 49 will be curtailed and the clutch angled faces will ride up. This will cause clutch part 51 to move downwardly forcing pin 55 downwardly until pin 55 is free of the restraint of arm 66, whereupon spring 65 will cause pivotal movement of further housing 58 and disengagement of worm 60 from worm wheel 62. This pivotal movement causes wheel 68 to ride along cam track 69 thus pivoting arm 66 to its second position with part 67 raised. Rotation of lever or hand wheel 71 clockwise (as seen in the drawing) will reset the trip device and reengage worm 60 with worm wheel 62 for further feed of the quill.

The output shaft 63 may be manually operated by a lever 72 for effecting coarse feed of the quill and disengagement means (not shown) may be associated with this coarse feed lever so that the lever will only become operable when coarse feed is to be effected.

In a milling machine having the above mechanism, an operator having set up his tooling and workpiece on the machine and desiring to use power feed, would first select the feed direction required by movement of lever 6. Second, he would select the desired rate of feed by movement of lever 43. Then with the tool rotating, he would bring the tool to the workpiece by movement of the coarse feed lever 72.

The operator will then either set a depth stop on the machine and engage power feed by lever 71, or, if the travel is to be unrestricted, simply move the lever 71 to the engaged position. The trip mechanism will disconnect the feed when the depth stop is reached, when the tool encounters an unyielding obstruction or when the operator moves the lever 71 to the disengaged position.

Should the operator require the use of the fine feed handwheel 48, he would move either, or both, the lever 43 or lever 6 to a neutral position and engage lever 71. The trip mechanism functions in the normal manner for overload or depth setting.

The assembly described above, while eminently suitable for use in a milling machine has other applications in machines where several facilities are desirable.

I claim:

1. In a machine tool including a drive shaft and a driven shaft, the improvement comprising a forward and reverse drive mechanism, said mechanism including:
   a worm gear on the drive shaft for rotation therewith,
   a forward drive lay shaft,
   a first worm wheel on the forward drive lay shaft for rotation therewith,
   a reverse drive lay shaft,
   a second worm wheel on the reverse drive lay shaft for rotation therewith,
   a pivoted housing carrying said forward drive lay shaft and said reverse drive lay shaft, said shafts being carried so that said first worm wheel and said second worm wheel are disposed on opposite sides of said worm gear, whereby said first worm wheel and said second worm wheel can be selectively engaged with said worm gear upon pivotal movement of said housing,
   a gear wheel on said driven shaft for rotation therewith, and
   gear means drivingly connecting said forward and said reverse lay shafts with said gear wheel, whereby when said housing is pivoted to engage said first worm wheel with said worm gear said driven shaft will be driven in a forward direction, and when said housing is pivoted to engage said second worm wheel with said worm gear said driven shaft will be driven in the reverse direction.

2. In a machine tool including a drive shaft and a driven shaft, the improvement comprising a forward and reverse drive mechanism, said mechanism including:
   a worm gear on the drive shaft for rotation therewith, a forward drive lay shaft,
a first worm wheel on the forward drive lay shaft for rotation therewith,
a reverse drive lay shaft,
a second worm wheel on the reverse drive lay shaft for rotation therewith,
a pivoted housing carrying said forward drive lay shaft and said reverse drive lay shaft, said shafts being carried in parallel relationship and so that said first worm wheel and said second worm wheel are disposed on opposite sides of said worm gear, whereby said first worm wheel and said second worm wheel can be selectively engaged with said worm gear upon pivotal movement of said housing,
a spiral gear wheel on said driven shaft for rotation therewith,
a spiral pinion gear on one of said lay shafts for rotation therewith, and disposed in meshing engagement with said spiral gear wheel,
a spur gear on each of said parallel lay shafts for rotation therewith, and disposed opposite each other, and
an idler spur gear carried by said housing and disposed between and in meshing engagement with both of said lay shaft spur gears, for effecting driving of said one lay shaft carrying said spiral pinion gear from the other of said lay shafts.

3. In a machine tool including a drive shaft and a driven shaft, the improvement comprising a forward and reverse drive mechanism, said mechanism including:
  a worm gear on the drive shaft for rotation therewith,
  a forward drive lay shaft,
  a first worm wheel on the forward drive lay shaft for rotation therewith,
  a reverse drive lay shaft,
  a second worm wheel on the reverse drive lay shaft for rotation therewith,
  a bevel gear wheel on said driven shaft for rotation therewith,
  a pivoted housing carrying said forward drive lay shaft and said reverse drive lay shaft, said shafts being carried so that said first worm wheel and said second worm wheel are disposed on opposite sides of said worm gear, whereby said first worm wheel and said second worm wheel can be selectively engaged with said worm gear upon pivotal movement of said housing, both of said shafts being carried by said housing with the longitudinal axes thereof disposed radially to said bevel gear wheel on said driven shaft, and
  a bevel gear on each of said lay shafts for rotation therewith and in meshing engagement with said bevel gear wheel.

4. In a machine tool as defined in claim 1, the improvement further comprising said housing being pivotally mounted for movement about the axis of the said driven shaft, and
  manually operable means for movement of said housing to effect selective forward or reverse drive or disengagement of the drive.

5. In a machine tool, a forward and reverse drive assembly for a quill feed, comprising: a drive shaft; a worm gear on said drive shaft for rotation therewith; a forward drive lay shaft; a first worm wheel on the forward drive lay shaft for rotation therewith, a reverse drive lay shaft; a second worm wheel on the reverse drive lay shaft for rotation therewith; a pivoted housing carrying said forward drive lay shaft and said reverse drive lay shaft for selective engagement of said first worm wheel and said second worm wheel with said worm gear upon pivotal movement of said housing; a driven shaft; a gear wheel on said driven shaft for rotation therewith; gear means drivingly connecting said forward and said reverse lay shafts with said gear wheel whereby when said housing is pivoted to engage said first worm wheel with said worm gear, said driven shaft will be driven in a forward direction, and when said housing is pivoted to engage said second worm wheel with said worm gear, said driven shaft will be driven in the reverse direction; a speed change gear assembly adapted to be driven in either a forward or a reverse direction by said driven shaft; an intermediate shaft driven in either a forward or a reverse direction by said speed change gear assembly; an output shaft for feeding the quill; a trip device drivingly connecting said intermediate shaft with said output shaft, said trip device disconnecting said output shaft from said intermediate shaft when the forward or reverse speed of the quill is prevented by an obstruction; and a fine feed shaft coupled to said intermediate shaft for effecting fine feed of the quill.

6. In a machine tool as defined in claim 5, the improvement further comprising said forward feed lay shaft and said reverse feed lay shaft being disposed parallel to each other, and said gear means comprises a spiral pinion carried by one of said lay shafts and in engagement with said gear wheel, and an idler gear coupling the other said lay shaft to said one lay shaft.

7. In a machine tool as defined in claim 6 wherein said gear means further comprises a spur gear carried by each of said lay shafts, each of said spur gears being in engagement with said idler gear.

8. In a machine tool as defined in claim 5 wherein said gear wheel is a bevel gear wheel and said gear means comprises a bevel gear carried by each of said lay shafts and in engagement with said bevel gear wheel, both of said lay shafts being disposed radially to said bevel gear wheel.

9. In a machine tool as defined in claim 5 wherein said housing is pivotally mounted for movement about the axis of said driven shaft, and manually operable means is provided for movement of the housing to effect forward and reverse drive, or disengagement of the drive.

10. In a machine tool as defined in claim 5, an operating means for said speed change gear assembly so arranged that said operating means has successive positions corresponding to a successive increase or decrease in the speed change ratio of said speed change gear assembly.

11. In a machine tool as defined in claim 5, a manually operable means connected to said output shaft to provide coarse feed of said quill.

* * * * *